United States Patent
Yamada et al.

(10) Patent No.: US 8,537,499 B2
(45) Date of Patent: *Sep. 17, 2013

(54) DISK DRIVE SUSPENSION HAVING FLEXURE AND LOAD BEAM WITH INSULATING SPACE BETWEEN LOAD BEAM AND CONDUCTOR OF FLEXURE

(75) Inventors: Yukie Yamada, Yokohama (JP); Naoki Yamaguchi, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,628

(22) Filed: Jul. 9, 2012

(65) Prior Publication Data

US 2012/0275065 A1    Nov. 1, 2012

Related U.S. Application Data

(62) Division of application No. 12/711,370, filed on Feb. 24, 2010, now Pat. No. 8,243,394.

(30) Foreign Application Priority Data

Mar. 6, 2009 (JP) .................................. 2009-053563

(51) Int. Cl.
*G11B 5/48* (2006.01)
*G11B 21/16* (2006.01)

(52) U.S. Cl.
USPC ...................... 360/246; 360/244.3; 360/245.9

(58) Field of Classification Search
USPC ........................... 360/244.3, 245.8, 245.9, 246
See application file for complete search history.

(56) References Cited

U.S. PATENT DOCUMENTS

| 5,694,270 | A | | 12/1997 | Sone et al. | |
| 5,754,369 | A | * | 5/1998 | Balakrishnan | 360/264.2 |
| 5,812,344 | A | * | 9/1998 | Balakrishnan | 360/245.9 |
| 5,995,328 | A | * | 11/1999 | Balakrishnan | 360/245.9 |
| 7,710,687 | B1 | * | 5/2010 | Carlson et al. | 360/244.3 |

(Continued)

FOREIGN PATENT DOCUMENTS

| JP | 6-295545 A | | 10/1994 |
| JP | 06295545 A | * | 10/1994 |
| JP | 2004-133988 A | | 4/2004 |
| JP | 2010-170647 A | | 8/2010 |

OTHER PUBLICATIONS

Japanese Office Action dated Aug. 21, 2012 (and English translation thereof) in counterpart Japanese Application No. 2009-053563.

*Primary Examiner* — Craig A. Renner
(74) *Attorney, Agent, or Firm* — Holtz, Holtz, Goodman & Chick, PC

(57) ABSTRACT

A slit is formed between two opposite side portions of a metal base made of an electrically conductive material. The slit penetrates the metal base thicknesswise and extends longitudinally relative to the metal base. An insulating layer is formed on the metal base. A first conductor is formed within the slit. The first conductor extends longitudinally relative to the metal base along the slit. A second conductor is formed on the insulating layer. The second conductor faces the first conductor across the insulating layer. The second conductor extends longitudinally relative to the metal base along the first conductor. The metal base and the first conductor consist of a common base material, such as a stainless-steel plate. The first conductor is formed by etching the base material.

11 Claims, 8 Drawing Sheets

(56) References Cited

U.S. PATENT DOCUMENTS

| | | | |
|---|---|---|---|
| 8,243,394 B2 * | 8/2012 | Yamada et al. | 360/246 |
| 2004/0264056 A1 * | 12/2004 | Jang et al. | 360/245.9 |
| 2005/0280944 A1 | 12/2005 | Yang et al. | |
| 2006/0151427 A1 | 7/2006 | Arya et al. | |
| 2006/0152855 A1 | 7/2006 | Arya et al. | |
| 2006/0158783 A1 | 7/2006 | Arya et al. | |
| 2010/0157482 A1 | 6/2010 | Hirata | |

\* cited by examiner

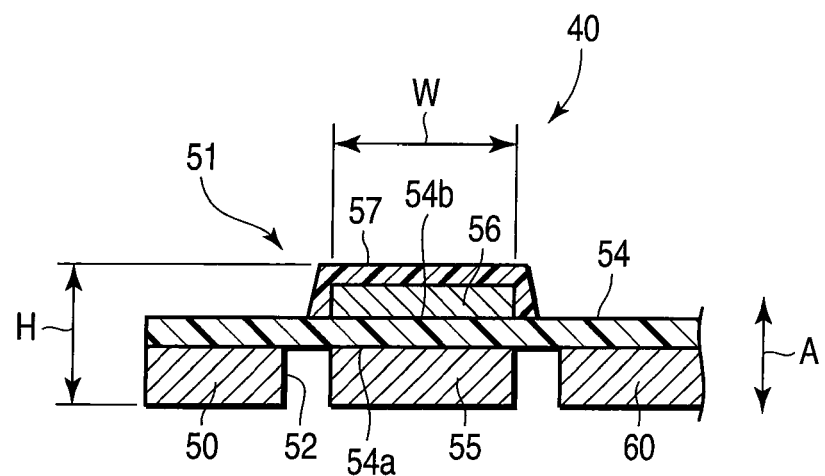
F I G. 4
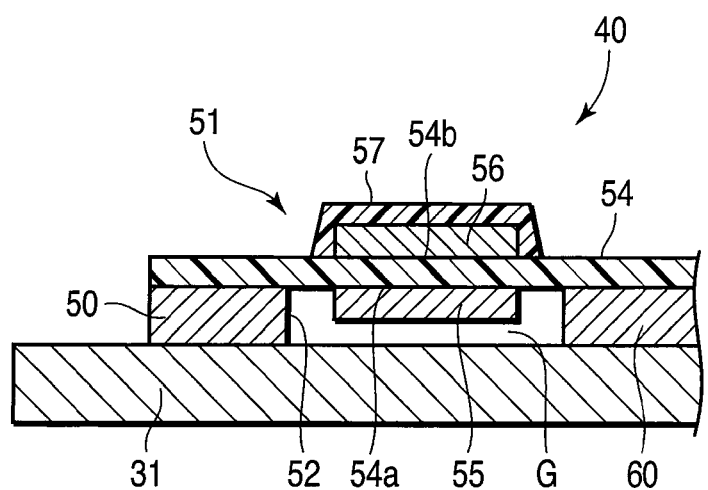
F I G. 5

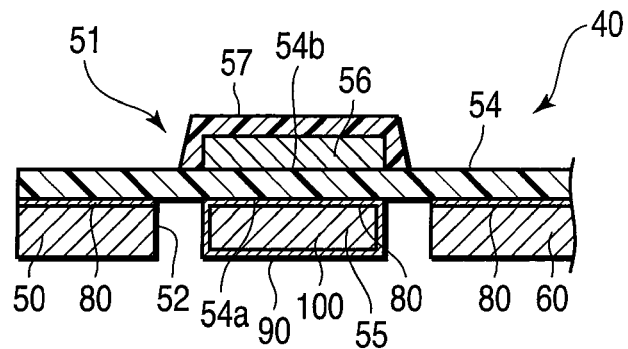
F I G. 14
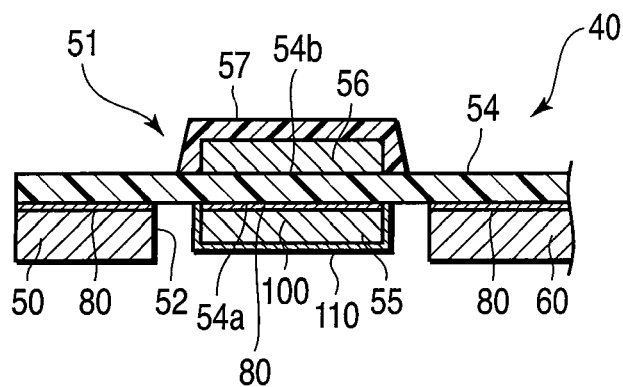
F I G. 15
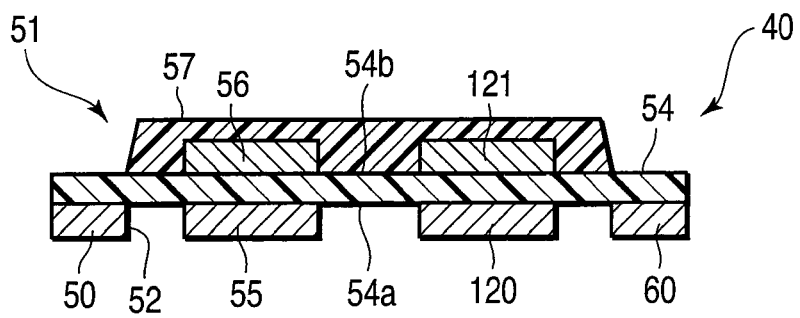
F I G. 16

DISK DRIVE SUSPENSION HAVING FLEXURE AND LOAD BEAM WITH INSULATING SPACE BETWEEN LOAD BEAM AND CONDUCTOR OF FLEXURE

CROSS-REFERENCE TO RELATED APPLICATIONS

This is a Divisional of U.S. application Ser. No. 12/711,370, filed Feb. 24, 2010 now U.S. Pat. No. 8,243,394, which is based upon and claims the benefit of priority from prior Japanese Patent Application No. 2009-053563, filed Mar. 6, 2009, the entire contents of both of which are incorporated herein by reference.

BACKGROUND OF THE INVENTION

1. Field of the Invention

The present invention relates to a disk drive flexure used in a hard disk drive (HDD) for an information processing apparatus, such as a personal computer.

2. Description of the Related Art

A hard disk drive is used in an information processing apparatus, such as a personal computer. The hard disk drive comprises a magnetic disk that rotates around a spindle, a carriage that turns around a pivot, etc. A disk drive suspension is disposed on an arm of the carriage.

The disk drive suspension comprises a load beam, a flexure lapped on the load beam, etc. A slider is mounted on a gimbal portion formed near the distal end of the flexure. The slider is provided with elements (transducers) for access, such as reading or writing. The suspension, flexure, etc., constitute a head gimbal assembly.

The flexure may be of any of various practical types corresponding to required specifications, and a flexure with conductors is disclosed as one example thereof in Jpn. Pat. Appln. KOKAI Publication No. 2004-133988 (Patent Document 1). The flexure with conductors comprises a metal base, insulating layer formed on the metal base, and conductors formed on the insulating layer. The metal base consists of a thin stainless-steel plate. The insulating layer consists of an electrically insulating material, such as polyimide. The conductors consist of copper. Respective one ends of the conductors are connected to elements (e.g., magnetoresistive [MR] elements) of the slider. The other ends of the conductors are connected to an electronic circuit, such as an amplifier.

The impedance of a conductive circuit portion of the flexure is expected to be reduced in order to match the amplifier and slider elements and reduce energy consumption. In laying out the flexure in a narrow space within the disk drive, the thickness and width of the conductive circuit portion should be minimized.

The flexure disclosed in Patent Document 1 comprises a conductive circuit portion of a multi-layer type. FIG. 17 shows an example of the multi-layer conductive circuit portion. In the conductive circuit portion shown in FIG. 17, an insulating layer 2 is formed thicknesswise relative to a metal base 1. A first conductor 3 is formed on the insulating layer 2. The first conductor 3 is covered by a first cover layer 4 made of an insulating material. A second conductor 5 is formed on the first cover layer 4. The second conductor 5 is covered by a second cover layer 6 made of an insulating material.

In the multi-layer conductive circuit portion shown in FIG. 17, the conductors 3 and 5 are located thicknesswise, so that their width W1 can be made relatively large despite the narrowness of the conductive circuit portion. Thus, the conductive circuit portion has an advantage that its impedance can be reduced. Since the metal base 1, insulating layer 2, conductors 3 and 5, and cover layers 4 and 6 are lapped thicknesswise relative to the conductive circuit portion, however, a thickness H1 of the circuit portion is inevitably large.

FIG. 18 shows a conventional flat-type conductive circuit portion. In this flat circuit portion, first and second conductors 3 and 5 are arranged transversely relative thereto in parallel relation along an insulating layer 2 formed on a metal base 1. The conductors 3 and 5 are covered by a cover layer 4. The flat conductive circuit portion has an advantage over the multilayer version in having a smaller thickness H2. Since the pair of conductors 3 and 5 are arranged transversely within the width W2 of the conductive circuit portion, however, the conductors 3 and 5 cannot be widened. Thus, there is a problem that the inductance and impedance of the conductive circuit portion are high.

BRIEF SUMMARY OF THE INVENTION

The object of the present invention is to provide a disk drive flexure with excellent electrical properties of which a multilayer conductive circuit portion can be thinned.

A flexure according to the present invention is disposed on a load beam of a disk drive suspension. The flexure comprises a plate-like metal base made of an electrically conductive material, a slit formed between two opposite side portions of the metal base, an insulating layer made of an electrically insulating material, a first conductor formed within the slit, and a second conductor.

The slit penetrates the metal base thicknesswise, and extending longitudinally relative to the metal base. The insulating layer is formed on the metal base. The first conductor is laminated to a first surface of the insulating layer on the same side as the metal base, and extending longitudinally relative to the metal base along the slit. The second conductor is laminated to a second surface of the insulating layer on the side opposite from the metal base. The second conductor is facing the first conductor across the insulating layer, and extending longitudinally relative to the metal base along the first conductor. According to the present invention, the first conductor is located within the slit in the metal base, so that the conductive circuit portion can be thinned despite its multi-layer structure. Since the relatively wide first and second conductors are lapped thicknesswise, they can be located within a restricted width of the circuit portion. Thus, the inductance and impedance of the circuit portion can be reduced. Since the slit is formed in the metal base so as to extend along the conductors, moreover, an eddy-current loss of the circuit portion can be reduced to ensure excellent electrical properties.

In an aspect of the invention, the first conductor and the metal base consist of a common base material (e.g., stainless-steel plate), and contours of the metal base, the first conductor and the slits are shaped by etching the base material. In another aspect of the invention, the first conductor consists of a conductor material (e.g., copper) different from that of the metal base, the electrical conductivity of the conductor material being higher than that of the metal base.

In the present invention, the metal base may be lapped on the load beam so that an insulating space is defined between the first conductor and the load beam. A highly electrically conductive layer of a metal more conductive than the metal base may be formed between the first conductor and the insulating layer. An electrically conductive cover layer of a metal more conductive than the metal base may be formed on at least a part of the outer peripheral surface of the first conductor. An insulating coating of an electrically insulating material may be formed on at least a part of the outer peripheral surface of the first conductor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a partial cross-sectional view of the flexure taken along line F4-F4 of FIG. 3;

FIG. 5 is a partial cross-sectional view of the flexure taken along line F5-F5 of FIG. 3;

FIG. 14 is a partial sectional view of a flexure according to a tenth embodiment of the invention;

FIG. 15 is a partial sectional view of a flexure according to an eleventh embodiment of the invention;

FIG. 16 is a partial sectional view of a flexure according to a twelfth embodiment of the invention;

DETAILED DESCRIPTION OF THE INVENTION

A disk drive flexure according to a first embodiment of the present invention will now be described with reference to FIGS. 1 to 5.

Figure 1:
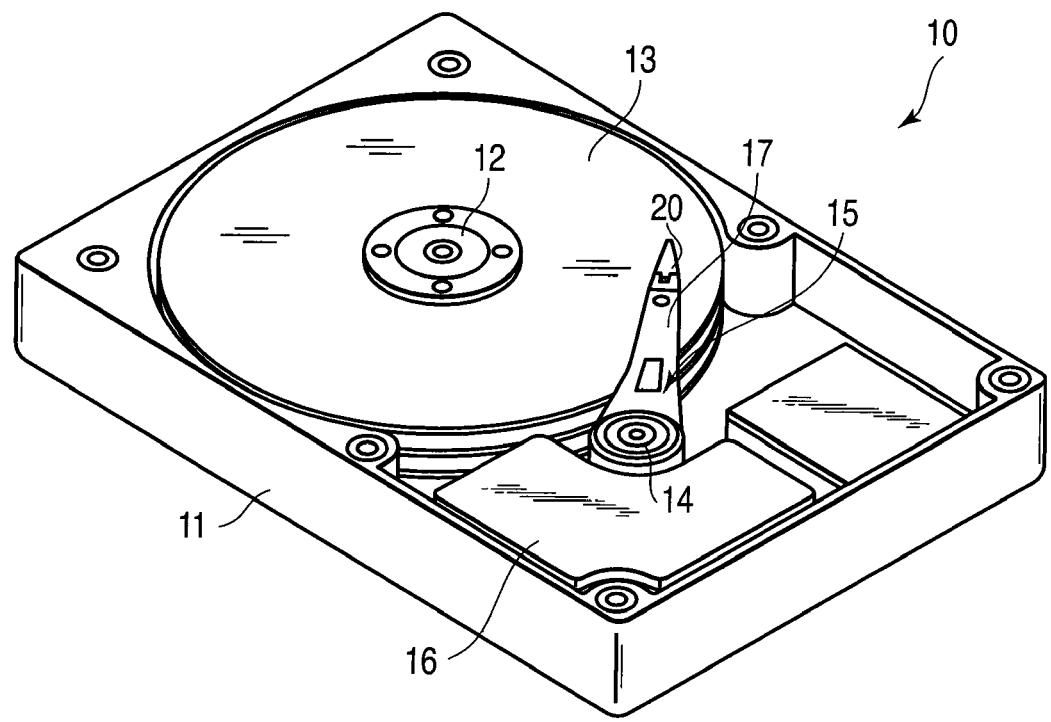
FIG. 1 is a perspective view showing an example of a disk drive with suspensions.

A hard disk drive (HDD) 10 shown in FIG. 1 comprises a case 11, disk 13, carriage 15, positioning motor 16, etc. The disk 13 rotates around a spindle 12. The carriage 15 is turnable around a pivot 14. The positioning motor 16 serves to drive the carriage 15. The case 11 is covered by a lid (not shown).

Figure 2:
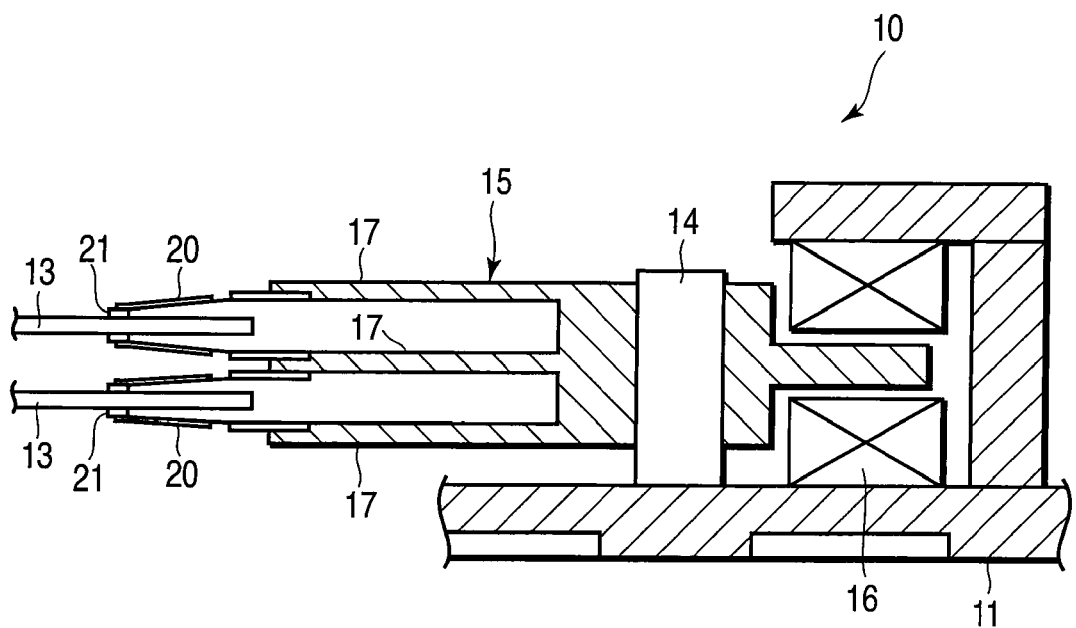
FIG. 2 is a partial sectional view of the disk drive shown in FIG. 1.

FIG. 2 is a sectional view typically showing a part of the disk drive 10. As shown in FIG. 2, arms 17 are disposed on the carriage 15. A suspension 20 is mounted on a distal end portion of each arm 17. A slider 21 constituting a magnetic head is disposed on the distal end of the suspension 20. If the disk 13 rotates at high speed, an air bearing is formed between the disk 13 and slider 21.

If the carriage 15 is turned by the positioning motor 16, the suspension 20 moves radially relative to the disk 13. Thereupon, the slider 21 moves to a desired track of the disk 13. A head portion of the slider 21 is provided with elements, such as MR elements, which can convert electrical and magnetic signals. The disk 13 can be accessed for writing or reading by these elements.

Figure 3:
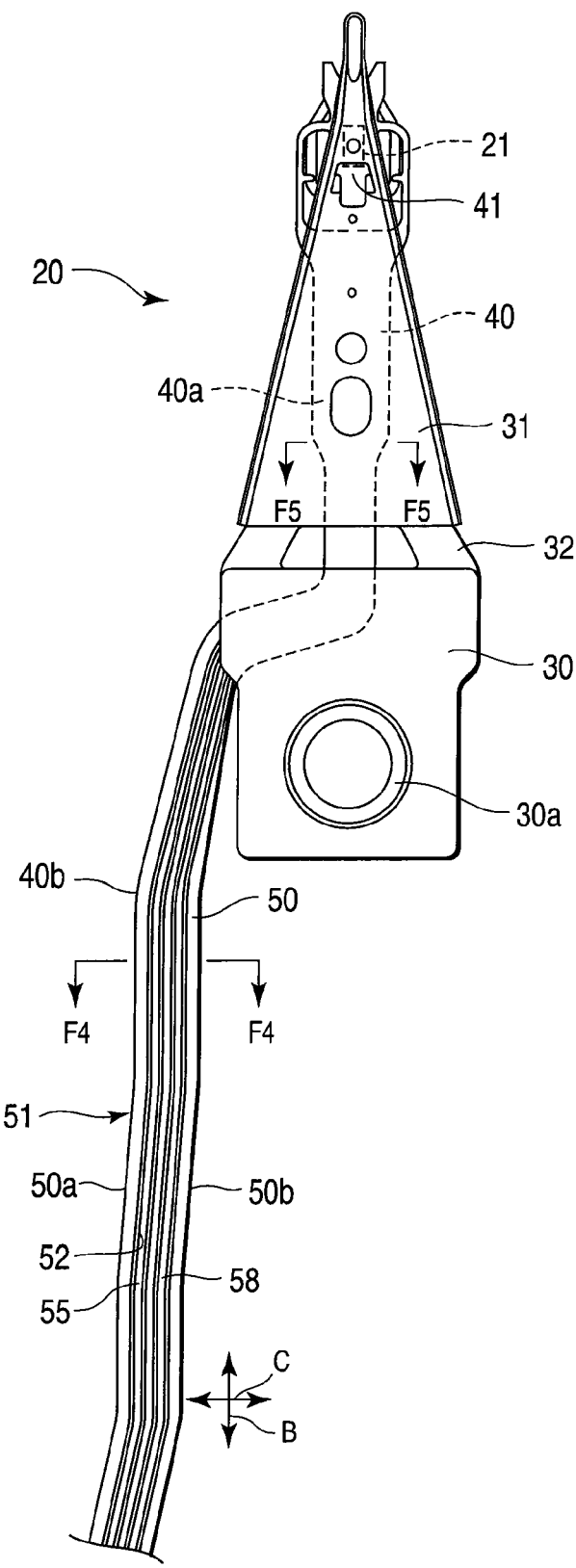
FIG. 3 is a plan view of a disk drive suspension with a flexure according to a first embodiment of the invention.

FIG. 3 shows the suspension 20 according to the first embodiment of the invention. The suspension 20 comprises a baseplate 30, load beam 31, hinge member 32 made of a thin spring plate, flexure 40 with conductors, etc. The flexure 40 with conductors will hereinafter be referred to simply as the flexure. A boss portion 30a of the baseplate 30 is fixed to the arms 17 (shown in FIGS. 1 and 2) of the carriage 15.

As shown in FIG. 3, the flexure 40 is located along the load beam 31. A portion 40a of the flexure 40 that overlaps the load beam 31 is fixed to the load beam 31 by fixing means, such as laser welding. A tongue 41 that functions as a gimbal portion is formed near the distal end of the flexure 40. The slider 21 is mounted on the tongue 41. A rear portion (tail portion) 40b of the flexure 40 extends behind the baseplate 30.

FIG. 4 is a partial sectional view of the flexure 40 taken along line F4-F4 of FIG. 3. The flexure 40 includes a metal base 50 and conductive circuit portion 51 formed along the metal base 50. In FIG. 4, arrow A indicates the thickness direction of the metal base 50. In FIG. 3, arrows B and C indicate the longitudinal and transverse directions, respectively, of the metal base 50.

A slit 52 is formed between opposite side portions 50a and 50b (FIG. 3) of the metal base 50. The slit 52 extends longitudinally relative to the metal base 50. As shown in FIG. 4, the slit 52 penetrates the metal base 50 thicknesswise.

The conductive circuit portion 51 includes an insulating layer 54 formed on the metal base 50, first and second conductors 55 and 56, and cover layer 57 that covers the second conductor 56. The insulating layer 54 and cover layer 57 consist of an electrically insulating material, such as polyimide. The first conductor 55 may be covered by an insulating cover layer. The pair of conductors 55 and 56 shown in FIG. 4 are used for writing. The flexure 40 may be provided with a pair of conductors 58 for reading (typically shown in FIG. 3).

The metal base 50 consists of an electrically conductive base material 60. The base material 60 is a springy stainless-steel plate, such as SUS304. The chemical composition (weight %) of SUS304, as defined by JIS (Japanese Industrial Standard) G4303, is as follows: 0.08 w % or less of C, 1.00 w % or less of Si, 2.00 w % or less of Mn, 0.045 w % or less of P, 0.030 w % or less of S, 8.00 to 10.50 w % of Ni, 18.00 to 20.00 w % of Cr, and the balance of Fe. The metal base 50 or base material 60 is thinner than the load beam 31. The thickness of the metal base 50 ranges, for example, from 15 to 20 μm. The thickness of the load beam 31 ranges, for example, from 30 to 62 μm. An example of the thickness of the conductors 55 and 56 is 10 μm. An example of the thickness of the insulating layer 54 is also 10 μm.

The first and second conductors 55 and 56 extend along the opposite side portions 50a and 50b, respectively, of the metal base 50. These conductors 55 and 56 are individually continuous longitudinally relative to the metal base 50. Respective one ends of the conductors 55 and 56 are connected to the elements (not shown) of the slider 21. The other ends of the conductors 55 and 56 are connected to an amplifier (not shown) of the disk drive 10.

The first conductor 55 is located within the slit 52. The first conductor 55 is laminated to a first surface 54a of the insulating layer 54. The first surface 54a is that one of the opposite surfaces of the insulating layer 54 on which the metal base 50 is located. The first conductor 55 extends longitudinally relative to the metal base 50 along the slit 52.

The second conductor 56 is laminated to a second surface 54b of the insulating layer 54. The second surface 54b is the other surface of the insulating layer 54 opposite from the metal base 50. The first and second conductors 55 and 56 face each other with the insulating layer 54 between them. The second conductor 56 extends longitudinally relative to the metal base 50 along the first conductor 55. The second conductor 56 consists of a highly conductive metal, such as deposited copper. The second conductor 56 is formed into a predetermined pattern along the insulating layer 54 by etching.

In the present embodiment, the metal base 50 and first conductor 55 consist of the common metallic base material 60. An example of the base material 60 is a stainless-steel plate, such as SUS304. The respective contours of the metal base 50, slit 52, and first conductor 55 are shaped as specified by etching the base material 60. Since the metal base 50 and first conductor 55 are equal in thickness, the first conductor 55 can be prevented from projecting outside the slit 52.

FIG. 5 shows a portion 40a at which the flexure 40 and load beam 31 overlap each other. The portion 40a is fixedly superposed on the load beam 31. The first conductor 55 is made thinner than the metal base 50 by half-etching or some other processing. Since the first conductor 55 is thinner than the metal base 50, an insulating space G for electrical insulation is defined between the first conductor 55 and load beam 31.

According to the conductive circuit portion 51 of the flexure 40 of the present embodiment, the first conductor 55 is confined within the slit 52 formed in the metal base 50. The second conductor 56 is located thicknesswise relative to the first conductor 55. Specifically, the first and second conductors 55 and 56 are lapped thicknesswise to form the multilayer conductive circuit portion 51. Although the circuit portion 51 of the present embodiment has a multi-layer structure, its thickness H (FIG. 4) can be made smaller than that of the conventional multi-layer conductive circuit portion.

Since the first and second conductors 55 and 56 are lapped thicknesswise, moreover, their width W (FIG. 4) can be made relatively large despite the narrowness of the conductive circuit portion 51. Thus, the inductance and impedance of the circuit portion 51 can be reduced. Since the slit 52 is formed in the metal base 50 so as to extend along the conductors 55 and 56, furthermore, an eddy-current loss of the circuit portion 51 can be reduced. The higher the frequencies of transmitted signals, the higher the eddy-current loss is. Since the eddy-current loss of the circuit portion 51 can be reduced, therefore, a high-frequency band can be obtained, so that the signals can be transmitted at higher speed.

Figure 6:
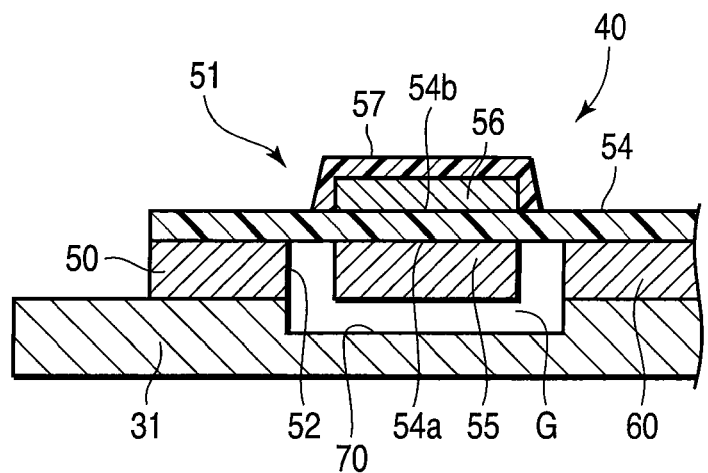
FIG. 6 is a partial sectional view of a flexure according to a second embodiment of the invention.

FIG. 6 is a partial sectional view of a flexure 40 according to a second embodiment of the invention. A recess 70 is formed opposite a first conductor 55 of a load beam 31. The recess 70 is formed by reducing the thickness of a part of the load beam 31 by half-etching or some other processing. The recess 70 defines an insulating space G for electrical insulation between the first conductor 55 and load beam 31. Since other configurations, functions, and effects of this second embodiment are the same as those of the flexure 40 of the first embodiment, common numbers are used to designate portions common to these two embodiments, and a description of those portions is omitted.

Figure 7:
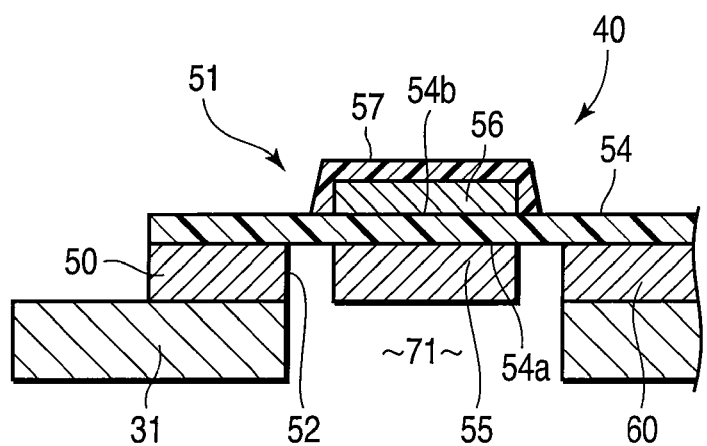
FIG. 7 is a partial sectional view of a flexure according to a third embodiment of the invention.

FIG. 7 is a partial sectional view of a flexure 40 according to a third embodiment of the invention. An opening 71 is formed opposite a first conductor 55 of a load beam 31. The opening 71 penetrates the load beam 31 thicknesswise. The opening 71 defines an insulating space for electrical insulation between the first conductor 55 and load beam 31. Since other configurations, functions, and effects of this third embodiment are the same as those of the flexure 40 of the first embodiment, common numbers are used to designate portions common to these two embodiments, and a description of those portions is omitted.

Figure 8:
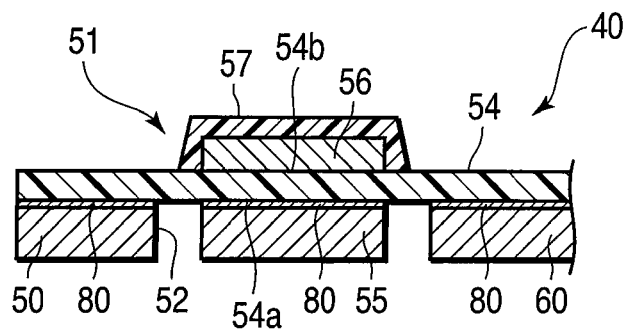
FIG. 8 is a partial sectional view of a flexure according to a fourth embodiment of the invention.

FIG. 8 is a partial sectional view of a flexure 40 according to a fourth embodiment of the invention. A first conductor 55 and metal base 50 consist of a common base material 60. An example of the base material 60 is a stainless-steel plate. A highly conductive layer 80 is formed between a first conductor 55 and insulating layer 54. The conductive layer 80 consists of a material (e.g., deposited copper) that is more conductive than the base material 60. The conductivity of the first conductor 55 is increased by the conductive layer 80. Since other configurations, functions, and effects of this fourth embodiment are the same as those of the flexure 40 of the first embodiment, common numbers are used to designate portions common to these two embodiments, and a description of those portions is omitted.

Figure 9:
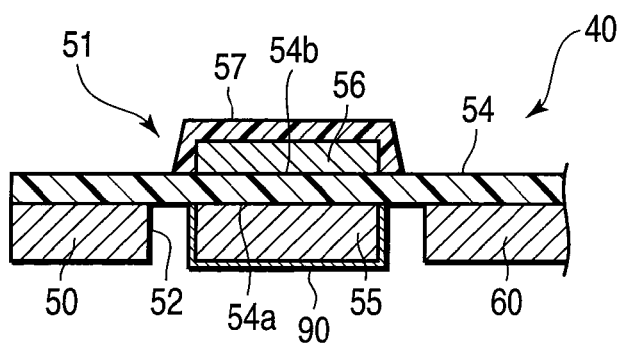
FIG. 9 is a partial sectional view of a flexure according to a fifth embodiment of the invention.

FIG. 9 is a partial sectional view of a flexure 40 according to a fifth embodiment of the invention. A first conductor 55 and metal base 50 consist of a common base material 60. An example of the base material 60 is a stainless-steel plate. A conductive cover layer 90 is formed on the outer peripheral surface of the first conductor 55 by, for example, plating. The conductive cover layer 90 consists of a metal (e.g., copper) that is more conductive than the base material 60. The conductivity of the first conductor 55 is increased by the conductive cover layer 90. Since other configurations, functions, and effects of this fifth embodiment are the same as those of the flexure 40 of the first embodiment, common numbers are used to designate portions common to these two embodiments, and a description of those portions is omitted.

Figure 10:
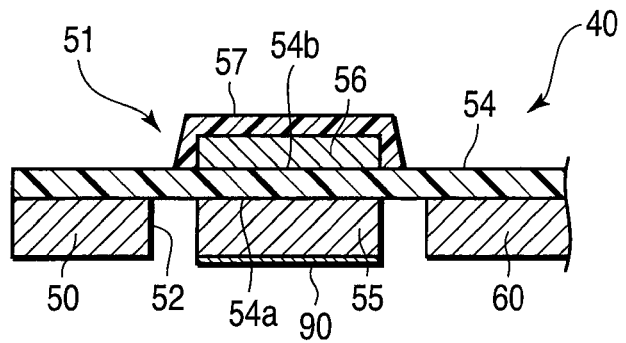
FIG. 10 is a partial sectional view of a flexure according to a sixth embodiment of the invention.

FIG. 10 is a partial sectional view of a flexure 40 according to a sixth embodiment of the invention. A first conductor 55 and metal base 50 consist of a common base material 60. An example of the base material 60 is a stainless-steel plate. A conductive cover layer 90 is formed on a part of the outer peripheral surface of the first conductor 55 by, for example, plating. The conductive cover layer 90 consists of a metal (e.g., copper) that is more conductive than the base material 60. The conductivity of the first conductor 55 is increased by the conductive cover layer 90. Since other configurations, functions, and effects of this sixth embodiment are the same as those of the flexure 40 of the first embodiment, common numbers are used to designate portions common to these two embodiments, and a description of those portions is omitted.

Figure 11:
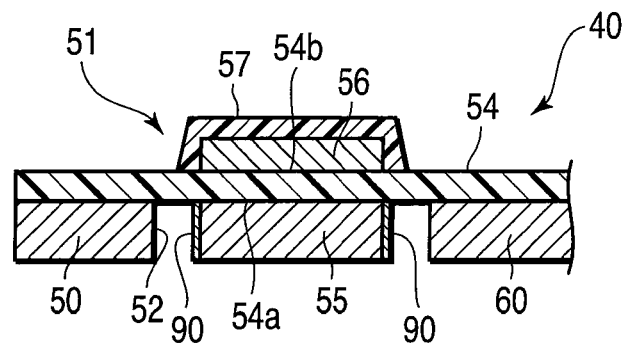
FIG. 11 is a partial sectional view of a flexure according to a seventh embodiment of the invention.

FIG. 11 is a partial sectional view of a flexure 40 according to a seventh embodiment of the invention. A first conductor 55 and metal base 50 consist of a common base material 60. An example of the base material 60 is a stainless-steel plate. Conductive cover layers 90 are formed individually on two opposite side surfaces of the first conductor 55 by, for example, partial plating. The conductive cover layers 90 consist of a metal (e.g., copper) that is more conductive than the base material 60. The conductivity of the first conductor 55 is increased by the cover layers 90. Since other configurations, functions, and effects of this seventh embodiment are the same as those of the flexure 40 of the first embodiment, common numbers are used to designate portions common to these two embodiments, and a description of those portions is omitted.

Figure 12:
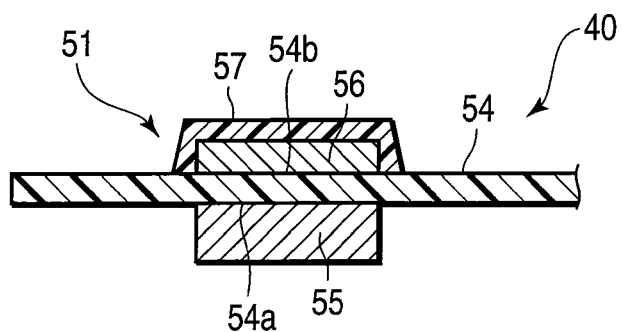
FIG. 12 is a partial sectional view of a flexure according to an eighth embodiment of the invention.

FIG. 12 is a partial sectional view of a flexure 40 according to an eighth embodiment of the invention. This flexure 40, like those of the foregoing embodiments, comprises first and second conductors 55 and 56. The first conductor 55 is located on a first surface 54a of an insulating layer 54. The second conductor 56 is located on a second surface 54b of the insulating layer 54. In this embodiment, the metal base 50 is removed by etching or the like. Thus, the first and second conductors 55 and 56 are substantially symmetrical with respect to the insulating layer 54 between them. In some cases, therefore, the flexure 40 can be used inside out.

Figure 13:
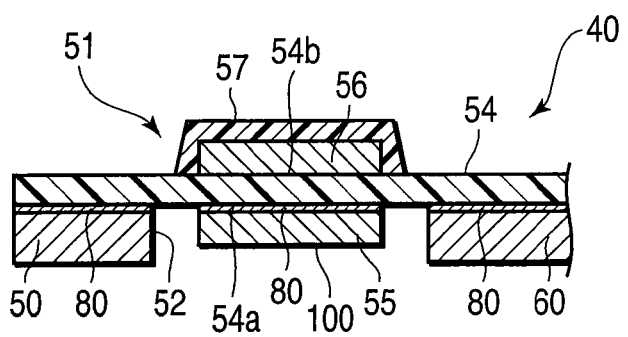
FIG. 13 is a partial sectional view of a flexure according to a ninth embodiment of the invention.
Figure 17:
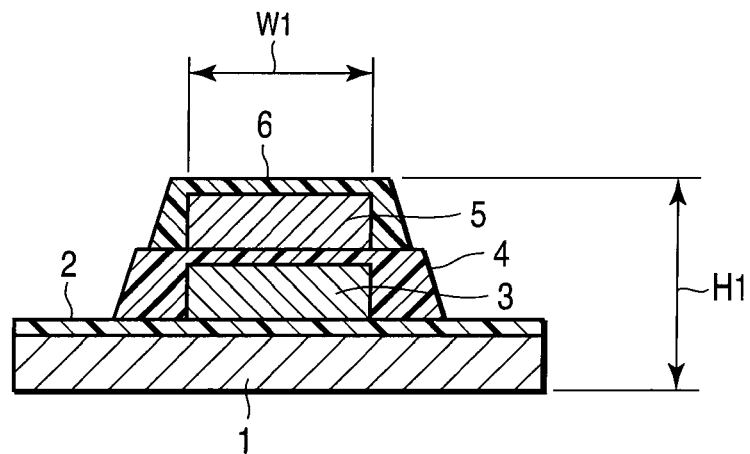
FIG. 17 is a partial sectional view of a conventional flexure.
Figure 18:
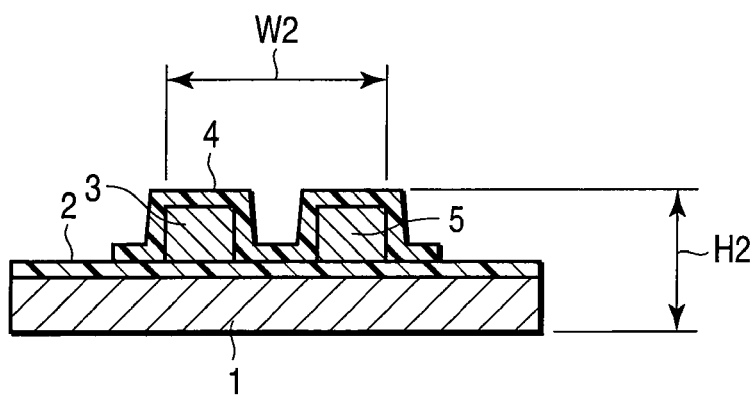
FIG. 18 is a partial sectional view of another conventional flexure.

FIG. 13 is a partial sectional view of a flexure 40 according to a ninth embodiment of the invention. A first conductor 55 consists of a conductor material 100. The conductor material 100 is, for example, copper or nickel. The conductor material 100 is more conductive than a base material 60 that forms a metal base 50. A highly conductive layer 80 is formed between an insulating layer 54 and first conductor 55. The conductive layer 80 consists of a metal more conductive than the base material 60. The first conductor 55 is formed on a surface of the highly conductive layer 80 by, for example, plating. Since other configurations, functions, and effects of this ninth embodiment are the same as those of the flexure 40 of the first embodiment, common numbers are used to designate portions common to these two embodiments, and a description of those portions is omitted.

FIG. 14 is a partial sectional view of a flexure 40 according to a tenth embodiment of the invention. A first conductor 55 consists of a conductor material 100. The conductor material 100 is more conductive than a base material 60 that forms a metal base 50. The conductor material 100 is, for example, copper or nickel. A highly conductive layer 80 of a metal more conductive than the base material 60 is formed between an insulating layer 54 and first conductor 55. A conductive cover layer 90 is formed on the outer peripheral surface of the first conductor 55 by, for example, plating. The conductive cover layer 90 consists of a metal (e.g., copper) that is more conductive than the metal base 50. Since other configurations, functions, and effects of this tenth embodiment are the same as those of the flexure 40 of the first embodiment, common numbers are used to designate portions common to these two embodiments, and a description of those portions is omitted.

FIG. 15 is a partial sectional view of a flexure 40 according to an eleventh embodiment of the invention. A first conductor 55 consists of a conductor material 100. The conductor material 100 is more conductive than a base material 60 that forms a metal base 50. The conductor material 100 is, for example, copper or nickel. A highly conductive layer 80 of a metal more conductive than the base material 60 is formed between a first conductor 55 and insulating layer 54. An insulating coating 110 of an electrically insulating material is formed on the outer peripheral surface of the first conductor 55. Since other configurations, functions, and effects of this eleventh embodiment are the same as those of the flexure 40 of the first embodiment, common numbers are used to designate portions common to these two embodiments, and a description of those portions is omitted.

FIG. 16 is a partial sectional view of a flexure 40 according to a twelfth embodiment of the invention. In this embodiment, a first conductor 55 for writing and another first conductor 120 for reading are located within a slit 52 in a metal base 50. These conductors 55 and 120 are laminated to a first surface 54a of an insulating layer 54. A second conductor 56 for writing and another second conductor 121 for reading are laminated to a second surface 54b of the insulating layer 54. Since other configurations, functions, and effects of this twelfth embodiment are the same as those of the flexure 40 of the first embodiment, common numbers are used to designate portions common to these two embodiments, and a description of those portions is omitted.

It is to be understood, in carrying out the present invention, that the constituent elements of the invention, including the slit, insulating layer, first and second conductors, etc., as well as the metal base that constitutes the flexure, may be embodied in various forms without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:
   a load beam; and
   a flexure which is disposed on the load beam, the flexure comprising a gimbal portion configured to mount a magnetic head provided with an electrical element for writing or reading;
   wherein the flexure comprises:
      a plate-like metal base made of a stainless-steel base material, the metal base including a first base portion which overlaps and is fixed to the load beam, and a second base portion which extends outside of the load beam and does not overlap the load beam;
      a slit formed between two opposite side portions of the metal base, penetrating the metal base thicknesswise, and extending longitudinally relative to the metal base;
      an insulating layer made of an electrically insulating material and formed on the metal base;
      a first conductor formed within the slit, laminated to a first surface of the insulating layer on a same side as the metal base, and extending longitudinally relative to the metal base along the slit, the first conductor being made of a same stainless-steel base material as the metal base and being electrically connected to the element of the magnetic head, and the first conductor comprising a non-overlapping portion which does not face the load beam and which extends along the second base portion of the metal base, the non-overlapping portion of the first conductor and the second base portion of the metal base being equal in thickness; and
      a second conductor laminated to a second surface of the insulating layer on a side opposite from the metal base, facing the first conductor across the insulating layer, and extending longitudinally relative to the metal base along the first conductor, the second conductor being electrically connected to the element of the magnetic head.

2. The disk drive suspension according to claim 1, wherein the first conductor comprises an etched contour.

3. The disk drive suspension according to claim 1, wherein a recess is formed in a part of the load beam which faces the first conductor, the recess defining an insulating space between the first conductor and the load beam.

4. The disk drive suspension according to claim 2, wherein a recess is formed in a part of the load beam which faces the first conductor, the recess defining an insulating space between the first conductor and the load beam.

5. The disk drive suspension according to claim 1, wherein an opening penetrating the load beam thicknesswise relative thereto is formed in a part of the load beam which faces the first conductor, the opening defining an insulating space between the first conductor and the load beam.

6. The disk drive suspension according to claim 2, wherein an opening penetrating the load beam thicknesswise relative thereto is formed in a part of the load beam which faces the first conductor, the opening defining an insulating space between the first conductor and the load beam.

7. The disk drive suspension according to claim 1, wherein a highly electrically conductive layer of a metal more conductive than the metal base is formed between the first conductor and the insulating layer.

8. The disk drive suspension according to claim 2, wherein a highly electrically conductive layer of a metal more conductive than the metal base is formed between the first conductor and the insulating layer.

9. The disk drive suspension according to claim 1, wherein an electrically conductive cover layer of a metal more conductive than the metal base is formed on at least a part of an outer peripheral surface of the first conductor.

10. The disk drive suspension according to claim 2, wherein an electrically conductive cover layer of a metal more conductive than the metal base is formed on at least a part of an outer peripheral surface of the first conductor.

11. The disk drive suspension according to claim 1, wherein the first conductor comprises an overlapping portion which faces the load beam and which extends along the first base portion of the metal base, and an insulating space is defined between the overlapping portion of the first conductor and the load beam.

\* \* \* \* \*